(12) United States Patent
Dugan et al.

(10) Patent No.: US 8,077,748 B1
(45) Date of Patent: Dec. 13, 2011

(54) HYBRID WAVEGUIDE LASER WITH A FIBER GAIN MEDIUM

(75) Inventors: Mark A. Dugan, Ann Arbor, MI (US); Ali Said, Ann Arbor, MI (US); Philippe Bado, Ann Arbor, MI (US)

(73) Assignee: Translume, Inc., Ann Arbor, MI (US)

( * ) Notice: Subject to any disclaimer, the term of this patent is extended or adjusted under 35 U.S.C. 154(b) by 0 days.

(21) Appl. No.: 12/691,871

(22) Filed: Jan. 22, 2010

(51) Int. Cl.
*H01S 3/30* (2006.01)
(52) U.S. Cl. .............................................. 372/6; 372/69
(58) Field of Classification Search .................. 372/6, 69
See application file for complete search history.

(56) References Cited

U.S. PATENT DOCUMENTS

| | | | |
|---|---|---|---|
| 5,134,620 A * | 7/1992 | Huber | 372/6 |
| 5,408,492 A * | 4/1995 | Vossler et al. | 372/94 |
| 5,627,848 A | 5/1997 | Fermann et al. | |
| 6,417,963 B1 | 7/2002 | Ohishi et al. | |
| 6,768,850 B2 * | 7/2004 | Dugan et al. | 385/124 |
| 7,294,454 B1 | 11/2007 | Said et al. | |
| 7,391,947 B1 | 6/2008 | Bado et al. | |

OTHER PUBLICATIONS

Ams, et al., "Monolithic 100 mW Yb waveguide laser fabricated using the femtosecond-laser direct-write technique," Optics Letters, vol. 34, No. 3, pp. 247-249 (Feb. 1, 2009).
Avakyants, et al., "A new phosphate laser glass," J. Opt. Technol., vol. 71, No. 12, pp. 828-829 (2004).
Bradford, et al., "Compensating for pump-induced distortion glass laser rods," Applied Optics, vol. 7, No. 12, pp. 2418-2420 (1968).
Buckley, et al., "Femtosecond fiber lasers with pulse energies above 10 nJ," Opt. Lett., vol. 30, No. 14, pp. 1888-1890 (2005).
Della Valle, et al., "1.5 μm Single longitudinal mode waveguide laser fabricated by femtosecond laser writing," Optics Express, vol. 15, Issue 6, pp. 3190-3194 (2007).
Erny, et al., "Mid-infrared difference-frequency generation of ultrashort pulses tunable between 3.2 and 4.8 μm from a compact fiber source," Opt. Lett., vol. 32, pp. 1138-1140 (2007).
Hartl, et al., "Integrated self-referenced frequency-comb laser based on a combination of fiber and waveguide technology," Optics Express, vol. 13, No. 17, pp. 6490-6496 (2005).
Kuwahara, et al., "Efficient coupling from semiconductor lasers into single-mode fibers with tapered hemispherical ends," Applied Optics, vol. 19, No. 15, pp. 2578-2583 (1980).
Proctor et al., "Passive mode-locking by use of waveguide arrays," Optics Letters, vol. 30, No. 15, pp. 2013-2015 (2005).
Sikorshi, et al., "Optical waveguide amplifier in Nd-doped glass written with near-IR femtosecond laser pulses," Electronics Letters, vol. 36, No. 3, pp. 226-227 (2000).
Stolen, "Modes in fiber optical waveguides with ring index profiles," Applied Optics, vol. 14, No. 7, pp. 1533-1537 (1975).
Timmermann, et al., "Highly efficient light coupling from GaAIAs lasers into optical fibers," Applied Optics, vol. 15, No. 10, pp. 2432-2433 (1976).
Watanabe et al., "Fabrication of Fresnel zone plate embedded in silica glass by femtosecond laser pulses," Optics Express, vol. 10, No. 19, pp. 978-983 (2002).

* cited by examiner

*Primary Examiner* — Kinam Park
(74) *Attorney, Agent, or Firm* — Lempia Braidwood Katz LLC (57) ABSTRACT

A laser includes a gain stage and a pump stage. The gain stage includes a fiber link that terminates at a pair of ends and includes a doped fiber. The pump stage includes a glass volume, the glass volume having a pair of fiber interface ports at which the pair of ends of the fiber link are disposed, respectively, for attachment of the gain stage and the pump stage in a ring laser assembly. The pump stage includes a plurality of intrinsic waveguides defined in the glass volume and disposed along in-bulk propagation paths within the glass volume for light travel through the ring laser assembly.

27 Claims, 9 Drawing Sheets

HYBRID WAVEGUIDE LASER WITH A FIBER GAIN MEDIUM

BACKGROUND OF THE DISCLOSURE

1. Field of the Disclosure

The disclosure relates generally to waveguide lasers and, more particularly, to waveguide lasers with a fiber gain medium.

2. Brief Description of Related Technology

Fiber lasers are often the optical sources of choice for demanding environments and stringent field-deployment requirements. Fiber lasers are generally regarded as possessing a number of advantageous characteristics. They are considered quite versatile, with operation at various wavelengths and the capability of being tuned over large wavelength ranges. Fiber lasers have been designed to generate short or ultrashort pulses, or have been used to generate very narrow linewidth pulses. They can be efficiently diode-pumped. They have a very high surface to volume ratio, which provides for excellent cooling of the lasing medium. Without such cooling, thermal loading (i.e., excessive heat buildup) can limit laser performance, especially in field usage.

Fiber lasers are also generally considered field-compatible because the "intracavity" light propagation is tightly guided by the fiber. The fiber medium guides the optical signal and protects it from environmental perturbations.

Unfortunately, the insensitivity of fiber lasers to the environment is generally not achieved in reality. The versatility and advantageous characteristics of fiber lasers often comes at the cost of environmental sensitivity. For example, while the frequency of some fiber lasers can be tuned, such tuning typically requires free-space components that compromise the robustness and the stability of the fiber laser. For more advanced fiber lasers, this environmental sensitivity is a serious problem.

Tuning is not the only feature generally associated with advanced fiber lasers that can be achieved only with awkward add-on components that diminish the robustness of the laser. Efforts to apply fiber lasers in scenarios involving both tuning and short pulse generation have also relied on such arrangements. See, for example, C. Erny, et al., "Mid-infrared difference-frequency generation of ultrashort pulses tunable between 3.2 and 4.8 μm from a compact fiber source," Opt. Lett., Vol. 32, pp. 1138-1140 (2007). Because fiber lasers are composed of fiber-based and non-fiber-based elements, the light signal, as it propagates through the laser cavity, must exit and re-enter the fiber section. While exiting the fiber is generally relatively simple (at least for low power/low energy system), re-entering the fiber after traveling through an air gap is quite a difficult task. The optical signal generally must be pointed onto the fiber core. The fiber core is typically 6-8 microns in diameter (e.g., for single-mode fibers). As a result, even minute mechanical drifts will strongly affect the coupling of the optical signal into the fiber. Furthermore, any dust or other contaminants that land on the fiber core will block the incoming signal either partially or fully. In some cases, a contaminant can burn onto the face of the fiber, causing permanent damage. Moreover, the air gap also introduces a segment where the beam propagates in an open environment where it is subject to air currents.

Past attempts at addressing the problems of in-fiber and out-of-fiber transitions have tried to lessen this problem by developing special ends of fiber elements, e.g., coreless fiber segments, sapphire fiber tips, etc. While these approaches may help lessening some of the in-fiber and out-of-fiber transitions issues, they introduce new problems by, for instance, being complex and often very bulky.

For the foregoing reasons, advanced fiber lasers are not made simply out of fibers and fiber-based components. Fiber lasers instead contain numerous free-space components (i.e. components where the light propagates unconstrained by a physical guide). See, for example, the traditional fiber laser described in U.S. Pat. No. 5,627,848. Free space components and the foregoing fiber transitions significantly degrade performance and introduce difficulties in demanding field-applications. Thus, fiber lasers have, in theory, numerous desirable features as a source for operation in demanding environments. Nonetheless, in practice, it is generally not possible to fully exploit these features, because all but the simplest fiber lasers contain extraneous components where the light propagation is unconstrained by waveguiding elements and exposed to the environment.

SUMMARY OF THE DISCLOSURE

In accordance with one aspect of the disclosure, a laser includes a gain stage with a fiber link, the fiber link including a doped fiber and terminating at a pair of ends. The laser further includes a pump stage with a glass volume, the glass volume having a pair of fiber interface ports at which the pair of ends of the fiber link are disposed, respectively, for attachment of the gain stage and the pump stage in a ring laser assembly. The pump stage includes a plurality of intrinsic waveguides defined in the glass volume and disposed along in-bulk propagation paths within the glass volume for light travel through the ring laser assembly.

In some cases, each fiber interface port includes a fiber reception hole in a side of the glass volume. One or more of the fiber reception holes may be tapered. Alternatively or additionally, each fiber interface port includes a secondary side hole and a channel linking the fiber reception hole and the secondary side hole.

Multiple waveguides of the plurality of intrinsic waveguides may be arranged as a pump coupler. Alternatively or additionally, a number of the plurality of intrinsic waveguides may be arranged as an interferometer. Alternatively or additionally, the pump stage may further include an intrinsic grating defined in the glass volume along a respective waveguide of the plurality of intrinsic waveguides.

In some cases, the pump stage includes an intrinsic high/low intensity discriminator defined in the glass volume. The intrinsic discriminator may include an array of parallel waveguide segments disposed alongside a respective one of the in-bulk propagation paths. Each parallel waveguide segment may run along a path radially offset from the respective in-bulk propagation path and be arranged in one of a plurality of segment groups, each group forming a respective concentric ring about the respective in-bulk propagation path.

The pump stage may include an intrinsic polarizer defined in the glass volume. The intrinsic polarizer may include a respective region of modified refractive index alongside a respective one of the in-bulk propagation paths to introduce a polarization preference.

In some cases, the fiber link includes dual-clad fiber. The laser may further include a pump laser coupled to the pump stage via an input interface of the glass volume. The plurality of intrinsic waveguides may then include an input waveguide that runs from the input interface, and the pump stage may further include an intrinsic splitter that includes a set of cladding-pumping intrinsic waveguides, each of which couples the input waveguide to an inner cladding of the dual-clad fiber. Alternatively, the pump stage further includes an intrinsic lens defined in the glass volume and configured to direct the carried pump light onto a face of the dual-clad fiber. The intrinsic lens may be spaced from an end of the input waveguide such that the pump light diverges along a further in-bulk propagation path within the glass volume before reaching the lens such that the lens focuses the pump light onto the face of the dual-clad fiber.

In accordance with another aspect of the disclosure, a laser includes a glass hub including a block of glass with a plurality of intrinsic waveguides defined along in-bulk propagation paths within the block, the block having a plurality of fiber attachment ports at which corresponding waveguides of the plurality of intrinsic waveguides terminate. The laser also includes a fiber link having a gain fiber and terminating at a pair of ends, each of which is disposed at a respective ring interface port of the plurality of fiber attachment ports for attachment of the glass hub and the fiber link in a ring laser assembly. The laser still further includes a pump laser coupled to the glass hub via an input interface port of the plurality of fiber attachment ports. Respective waveguides of the plurality of intrinsic waveguides are arranged as a pump coupler between the pump laser and the fiber link.

BRIEF DESCRIPTION OF THE DRAWING FIGURES

For a more complete understanding of the disclosure, reference should be made to the following detailed description and accompanying drawing figures, in which like reference numerals identify like elements in the figures, and in which.

While the disclosed lasers are susceptible of embodiments in various forms, there are illustrated in the drawing (and will hereafter be described) specific embodiments of the invention, with the understanding that the disclosure is intended to be illustrative, and is not intended to limit the invention to the specific embodiments described and illustrated herein.

DETAILED DESCRIPTION OF THE DISCLOSURE

The invention generally relates to waveguide lasers having stages or other components formed via different media and, thus, having different types of waveguides. A gain stage is generally provided by a gain fiber medium, and a pump stage is generally provided by a glass medium that includes a variety of optical devices. Thus, while one stage is based on fiber waveguides, the other stage is based on non-fiber waveguides. For these and other reasons set forth herein, the disclosed lasers are accordingly considered hybrid waveguide lasers.

The hybrid nature of the disclosed waveguide lasers eliminates the problems associated with traditional fiber lasers. In accordance with some aspects of the disclosure, one or more components of the disclosed lasers are generally constructed with fiber links and fiber-based components. However, the disclosed lasers utilize fiber links without relying on the non-fiber based components used in traditional fiber lasers to propagate the optical signal in a non-waveguided manner through free-space. Instead of free space optical components or stages, the disclosed hybrid waveguide lasers include an arrangement of one or more fiber links bonded or otherwise rigidly attached to a glass volume that encompasses a plurality of intrinsic waveguides (or waveguide segments) that collectively provide all of the functionalities used to customize and otherwise control the performance and operation of the laser. In this way, the glass volume acts as a hub of integrated devices and components with robust connections for the input, output, and fiber link interfaces.

In some cases, the disclosed lasers are fully waveguided in the sense that the optical signals propagate throughout a ring of the laser via waveguides in either a fiber link or the glass volume. Thus, in either stage of the laser, the signals always propagate in a waveguided environment. In other cases, the signals may travel through one or more unguided segments within the glass hub. As described in the examples below, the unguided travel may be associated with a short or limited segment of the propagation path in which a limited amount of divergence is desirable. In many, if not all, cases, the signals still avoid free or open space propagation and exposure to the environment, despite not being waveguided at all times. As described below, the signals remain guided at all other times via the fiber link and a number of intrinsic waveguides in the glass hub. In still other cases (e.g., when physical contaminants are not an issue), a physical boundary may be embedded to provide a lens or other element within the glass volume via a void or hole formed in the glass block. Because all of these arrangements involve in-bulk or embedded propagation paths, the lasers exhibit exceptional short- and long-term stability.

In accordance with some aspects of the disclosed lasers, the optical functionalities are allocated to, or handled by, either the fiber link or the glass volume. As described below, the primary role of the fiber link is to provide optical gain. The primary roles of the glass volume or hub are to (i) deliver the pump light needed to establish gain in the fiber, (ii) provide optical feedback to, and complete the laser ring with, the fiber needed to establish lasing, and (iii) ultimately control and shape the light generated by the gain fiber. Spectral, temporal, and polarization characteristics are controlled through optical devices or structures intrinsically formed within the glass volume. As described below, the glass hub also includes one or more features to permanently and precisely interface the fiber(s) with the intrinsic waveguides within the glass substrate.

Through these and other aspects of the disclosure, the disclosed lasers avoid the complications that arise in traditional fiber lasers when non-fiber elements drift in response to excessive mechanical shocks, vibrations and/or thermal shocks.

Several aspects of the disclosed lasers are directed to attachment of the two stages that avoids any free space components or links. A rigid or permanent attachment of the two stages provides a robust connection to support the advantages of the different media and waveguide types to be realized while avoiding the environmental complications arising from free space components.

Figure 1:
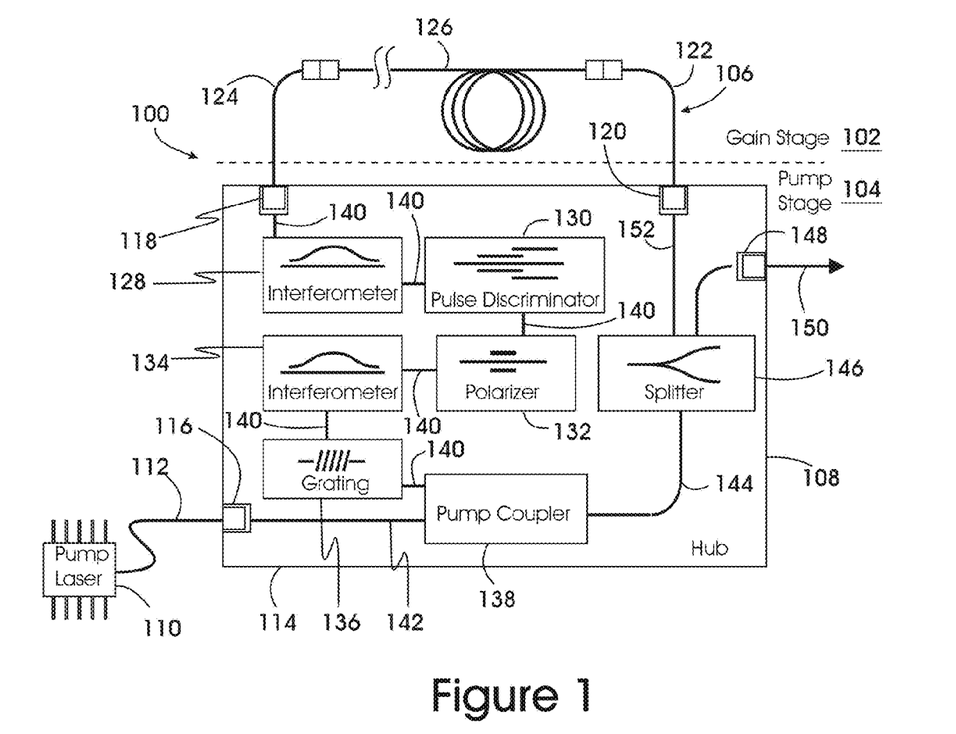
FIG. 1 is a block diagram of an exemplary hybrid waveguide laser with a gain fiber link terminating at a glass hub constructed in accordance with several aspects of the disclosure.

Turning now to the drawing figures, FIG. 1 depicts an exemplary hybrid waveguide laser 100 constructed in accordance with several aspects of the disclosure. The laser 100 has a gain stage 102 and a pump stage 104 generally configured in a ring laser assembly. The gain stage 102 includes a fiber link 106 that terminates at a pair of ends. Each end is attached to a glass hub 108 as described further below. The ring laser arrangement is generally formed via a path loop through the hub 108 and the fiber link 106.

A pump laser 110 is coupled to the hub 108 to support the pumping of the gain stage 102. In this example, the output of the pump laser 110 is provided via a fiber 112 rigidly attached to a glass substrate or volume 114. The fiber 112 terminates at an input fiber attachment interface or port 116 formed in a side surface of the glass volume 114. In some cases, the rigid attachment of the fiber 112 and the volume 114 includes an epoxy or other bond, examples of which are described below. Ring fiber attachment interfaces or ports 118 and 120 are formed in the volume 114 to accommodate the rigid attachment of the ends of the fiber link 106 to the volume 114. The locations of the interfaces or ports may vary considerably from the schematic illustration shown.

The configuration, type, and other characteristics of the pump laser 110 may vary considerably. In some cases, the pump laser 110 may be a commercially available diode laser. The attachment or coupling of the pump laser 110 may also vary from the example shown. Instead of relying on another fiber interface, the pump laser 110 may be mounted directly on the glass volume 114. A direct connection may avoid complications resulting from high power signals that burn a face of a fiber or fiber interface.

The fiber link 106 of this example includes multiple fiber segments in the interest of design flexibility. Generally speaking, the fiber link 106 may include different types of fiber to customize the fiber link 106 for a desired amount of gain. To that end, the fiber link 106 may have any number of gain (e.g., doped) fiber segments and any number of traditional (e.g., undoped) fiber segments. In this case, the fiber link 106 includes traditional fiber segments 122 and 124 that include the fiber link ends that terminate at the interfaces 120 and 118, respectively. Each traditional fiber segment 122, 124 may be undoped (or at least not for purposes of gain) so that the fiber link 106 has an appropriate length for the ring laser arrangement. That is, the segments 122, 124 add length to the link 106 without an appreciable or undesirable increase in losses. A variety of commercially available, undoped fibers may be used for the segments 122, 124, with a specific material, configuration, or other characteristic being selected in the interest of loss minimization.

The fiber link 106 includes a doped fiber segment 126 to provide gain. In this example, the doped fiber segment 126 is disposed between the traditional fiber segments 122, 124, although the positioning or order may vary as desired. A variety of commercially available, doped fiber materials may be used in the doped fiber segment 126, including, for instance, Erbium-doped fiber and Ytterbium-doped fiber. The doped fiber segment 126 may be coupled or connected to the traditional fiber segments 122, 124 in any desired or conventional manner, including, for instance, fusion splicing. Exemplary couplings are shown in FIG. 1 schematically for ease in illustration. The positioning of the doped fiber segment 126 may vary depending on interface compatibility. In some cases, the diameter of the doped fiber segment 126 may be more or less compatible with the size of the fiber attachment ports 118, 120, in which case the order or position of the various segments is varied accordingly. The position and length of the doped fiber segment 126 may also vary based on the installation, in which case, for example, traditional fiber may be used at positions where a bend or other handling considerations are applicable. The length of the doped fiber segment 126 relative to the traditional fiber segments 122, 124 may also be selected in view of one or more of the absorption rate or level of the doped fiber and the relative cost differential. Other characteristics of the fiber segments 122, 124, and 126 may also vary, including whether dual clad fiber is used in the gain fiber segment(s), as described further below.

The glass hub 108 includes and integrates a number of devices or components for controlling the operation of the laser 100. Each device or component is formed or embedded within the glass volume 114, which may be a block of, for instance, fused silica. The size and shape of the fused silica or other glass block may vary considerably, although fused silica substrates at 1-2 mm thicknesses are readily commercially available. Despite the multiple devices or components, the hub 108 (and the volume 114) constitutes a single, monolithic structure. Each device or component is generally written in the bulk of the glass volume 114 as one or more localized regions of modified refractive index. The shape and other characteristics of the region(s) determine the functionality of the device or component. The refractive index modifications are obtained via the direct-write, non-linear absorption processing with ultrafast pulsed, or femtosecond, lasers (e.g., lasers with pulses below 1 picosecond in duration), as described in U.S. Pat. Nos. 6,768,850 ("Method of index trimming a waveguide and apparatus formed of same"), 7,294,454 ("Waveguide fabrication methods and devices"), and 7,391,947 ("Waveguide fabrication methods and devices"), the disclosures of which are hereby incorporated by reference. Lasers suitable for generating ultrashort pulses are generally available from a number of companies and other sources, including Coherent, Inc. (Santa Clara, Calif.) under the trade name "RegA" and Spectra Physics (Mountain View, Calif.) under the trade name "Tsunami." Such ultrafast pulsed lasers can typically achieve pulse widths of less than 100 femtoseconds. Direct-writing within the glass volume 114 may be achieved with pulse energies of on the order of nano-Joules to several micro-Joules depending on the pulse widths as well as focusing optics.

The waveguides, optical devices, and other photonic structures within the glass hub 108 are generally referred to herein as "intrinsic" to distinguish the structures from optical elements that are formed via doping (e.g., ion implantation, diffusion), material removal (e.g., ablation to create a channel waveguide), and material deposition (e.g., epitaxial layering). While these fabrication processes may also result in a monolithic structure like the glass volume 114, the monolithic nature of the hub 108 differs in that the substance or material of each waveguide and other photonic structure in the volume 114 has a common chemical composition with the remainder of the bulk in which the structure is formed. Indeed, the glass volume 114 may have a uniform chemical composition, such that the surrounding bulk of the volume 114 has the same chemical composition as the regions within the volume 114 that correspond with the photonic structures. That is, each region within the volume has a common, uniform chemical composition, such that the refractive index is the defining factor between the photonic structure and the surrounding bulk of the volume 114. In some cases, the composition of the glass volume 114 may deviate from pure glass. In such cases, however, the composition remains uniform throughout the bulk of the volume 114, which includes compositions that are effectively uniform, in the sense that any gradient in the composition profile is either unintended, ancillary to, or not determinative or definitive of any photonic characteristics of a device or component of the hub 108. Thus, the term "glass" is used herein broadly to include $SiO_2$ without any impurities, as well as fused silica or other glasses that may have trace or larger amounts of impurities.

The intrinsic, embedded disposition of the devices in the glass volume 114 provide several reasons why the disclosed lasers are well suited for application and operation in demanding or harsh environments and other field uses. For instance, the interior disposition avoids the exposure-related complications of free-space components. Moreover, using fused silica or other glass as the substrate material for the waveguides and other structures in the hub 108 provides several advantages, including high thermal and vibration stability. These characteristics can be especially useful in connection with interferometric devices and other photonic structures.

The laser 100 may include a variety of different optical devices and photonic structures, each of which may be directed to controlling a different characteristic of the laser 100. One exemplary set of devices is shown in FIG. 1. The nature of the control characteristics may be, for instance, spectral, temporal, polarizing, or any combination thereof. Spectral characteristics such as wavelength, bandwidth, and linewidth may be addressed by an interferometer 128 (e.g., a Mach-Zehnder interferometer), while temporal characteristics such as pulse shaping may be addressed via a pulse discriminator 130. As described below, one or more devices similar in structure to the pulse discriminator 130 may also be incorporated into the hub 108 to act as an optical limiter. Polarization preferences may also be added, removed, or otherwise addressed via a polarizer 132. More generally, the hub 108 may include any number of these devices, arranged or disposed in any desired order. For example, further interferometric control may be provided by another interferometer 134 and a grating 136 before the optical signal is passed to a pump coupler 138. While the order and inclusion of these devices may vary from the example shown, the devices are generally coupled via a set of intrinsic waveguides 140 that, together with the waveguides and structures of the devices, form an in-bulk propagation path through the glass volume 114. For instance, the interferometers 128, 134 include one or more waveguides, or waveguide segments, that are disposed along the propagation path of the optical signal. These waveguides or waveguide segments may be contiguously and integrally formed with the waveguides 140, insofar as both are formed via the direct-write processing of the glass volume 114. That is, each of the devices and structures of the hub 108 are intrinsic devices for the reasons described above. The examples described below further exemplify this characteristic of the plurality of intrinsic waveguides within the hub 108.

Any two or more of the above-described devices or structures may be integrated to any desired extent. The discrete depiction of the devices in the example of FIG. 1 is for convenience in illustration. As described below, other examples need not have a waveguide-continuous, or fully guided, in-bulk propagation path, as in the example of FIG. 1. For instance, some devices or structures may involve segments of unmodified or varying refractive index (e.g., a grating). The connection between devices or structures may also benefit from a limited amount of signal divergence, in which case the signal may be unguided along a segment of the propagation path. Further details regarding the construction and configuration of the devices and structures are set forth in the above-referenced U.S. patents, the disclosures of which are incorporated by reference for these specific purposes as well.

In operation, the pump signal from the pump laser 110, which may be a diode laser, is provided via an intrinsic waveguide 142 to the pump coupler 138, which transfer the pump signal to the ring formed by the serial arrangement of the devices within the hub 108 and the fiber link 106. The resulting combination then passes through an intrinsic waveguide 144 that carries the pump signal energy toward the gain medium, thereby completing the laser ring arrangement. In this example, however, the signal is tapped for output purposes before reaching the fiber link 106 by a splitter 146. In this way, an output signal can be provided via a fiber attachment interface or port 148 and captured from an output fiber 150. That said, the output need not be provided via a fiber or fiber interface. The output may alternatively propagate via free space, if, for instance, a monitoring photodetector is mounted directly to the hub 108. The in-bulk propagation path of the exemplary laser ring arrangement shown in FIG. 1 is completed by the other output of the splitter 146 along an intrinsic waveguide 152.

The positioning and ordering of the splitter 146 and other devices may vary from the example shown. More specifically, the incorporation or interposition of the splitter 146 need not occur between the pump coupler 138 and the fiber link 106. In other cases, the splitter 146 or other device that taps the ring for output purposes may be disposed at any point along the in-bulk propagation path within the hub 108.

Figure 2A:
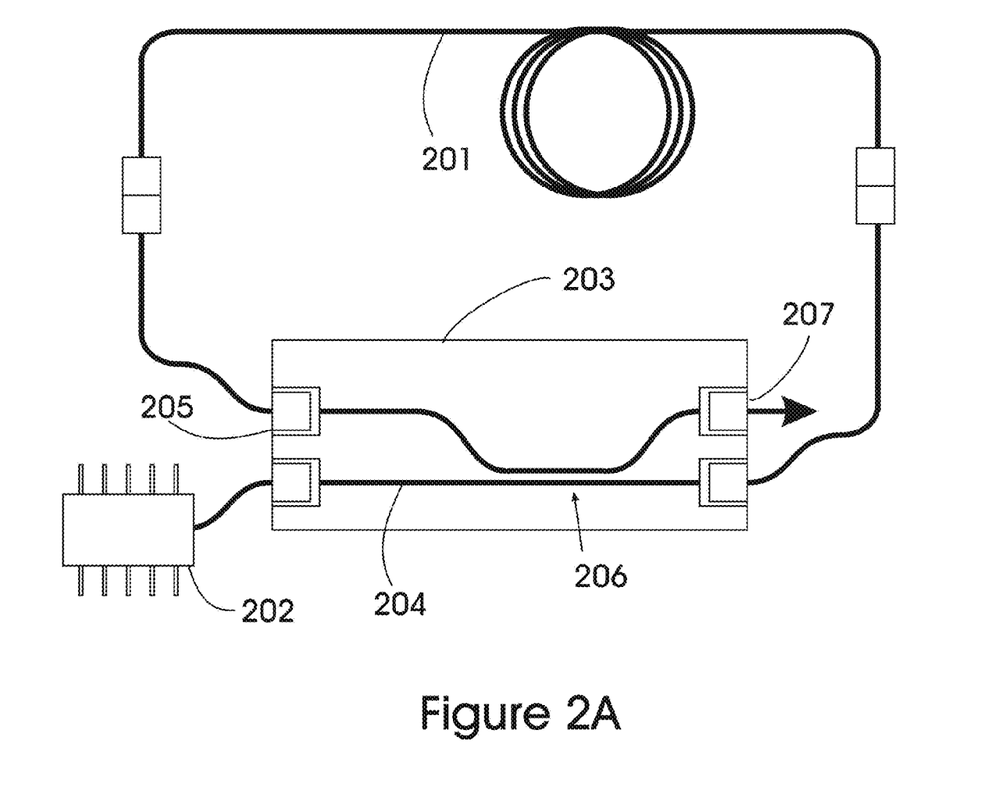
FIG. 2A is a schematic illustration of another exemplary hybrid waveguide laser having an intrinsic, in-bulk pump coupler formed in a glass hub in accordance with one embodiment and suitable for integration in the hub of FIG. 1.
Figure 2B:
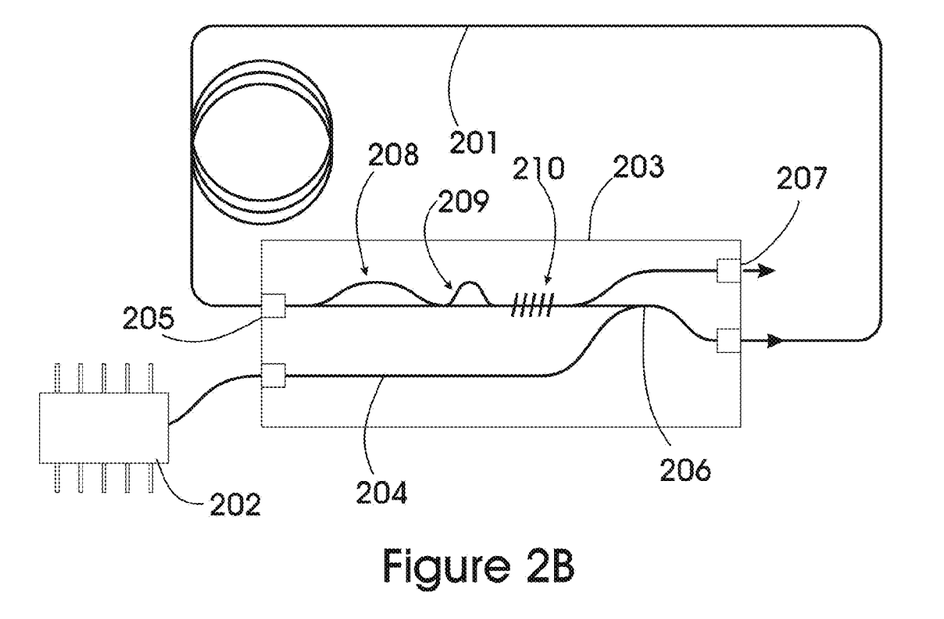
FIG. 2B is a schematic illustration of yet another exemplary hybrid waveguide laser having two intrinsic, in-bulk interferometers and an intrinsic, in-bulk grating formed in a glass hub to stabilize and otherwise control the lasing wavelength in accordance with one embodiment, each of which is also suitable for integration in the hub of FIG. 1.

Two further examples of hybrid waveguide laser constructed in accordance with aspects of the disclosure are illustrated in FIGS. 2A and 2B. FIG. 2A shows a laser in which a gain fiber 201, a pump (e.g., diode) laser 202, and a glass hub 203 are configured in a ring laser arrangement. The fiber link provided by the gain fiber 201 may be extended by standard fiber segments as shown, and as described above in connection with the example of FIG. 1. The glass hub 203 contains a plurality of intrinsic waveguides or waveguide segments 204 to transfer the optical energy between a number of input/output ports 205. In this example, the waveguide segments 204 generally lead to a coupler 206 that transfers the energy from the pump laser 202 to the gain fiber 201. To that end, the coupler 206 includes respective waveguide segments that are contiguously formed with the waveguide segments 204. In this case, the pump coupler 206 is configured to carry or transition the signal from the gain fiber 201 into the waveguide segment carrying the pump power. The signal resulting from the coupling transition into the pump power waveguide continues its propagation through the volume via a waveguide downstream of the pump coupler 206, which, in turn, leads to the gain fiber 201 to complete the laser ring arrangement. In this example, the pump coupler 206 is also configured to act as a tap or splitter so that a portion of the resulting signal is passed to a monitoring port 207 via another waveguide segment downstream of, and integrally formed with, the coupler waveguide initially carrying the signal from the gain fiber 201.

FIG. 2B shows a more complex embodiment, where like elements of FIG. 2A are indicated with like reference numerals. In this example, the hybrid waveguide laser again includes a gain fiber 201, a pump laser 202, and a central, glass hub 203 containing various waveguide segments 204 to transfer the optical energy between the various input/output ports 205. Some of the waveguide segments 204 form a coupler 206 that transfers the energy from the pump laser 202 to the gain fiber 201 via respective waveguide segments. While the coupler 206 may be similarly constructed and configured relative to the coupler shown in FIG. 2A, the schematic depiction in FIG. 2B illustrates an alternative waveguide arrangement. In some cases, the waveguides or waveguide segments used to deliver the optical signals to be combined need not rely on evanescent coupling (as in the example of FIG. 2A), but instead a direct connection of the waveguides (as schematically illustrated in FIG. 2B). The example of FIG. 2B also relies on an alternative splitter construction, in which the signal from the gain fiber 201 is tapped upstream of the pump coupler 206. The splitter includes an intrinsic waveguide that provides a laser output to an interface or port 207.

The hybrid waveguide laser of FIG. 2B also contains a set of intrinsic waveguide segments arranged to form a Mach-Zehnder interferometer 208 that controls one or more optical emission characteristics of the hybrid waveguide laser. A second intrinsic Mach-Zehnder interferometer 209 provides additional control. An intrinsic grating 210 also provides yet additional control. Further details regarding these devices and structures formed along the in-bulk propagation path of the hub 203 are set forth below.

The drawing figures provide several examples of the functionalities or features of the devices or structures that can be imbedded in the glass volume. Generally speaking, and depending on the applications (for example, narrow linewidth spectroscopy), the elements and features addressed below may be inserted in the network of waveguides found in the glass hub, which then forms a functional core of the hybrid waveguide laser.

Wavelength and bandwidth control. Wavelength control may be one feature or aspect of the disclosed lasers. Wavelength control may be useful in the hybrid waveguide configurations described herein, as most doped fiber media are capable of lasing over a very broad spectral band. The lasing wavelength is either controlled or otherwise it may shift across the lasing band. The example of FIG. 2B uses at least one element imbedded in the glass hub 203 to control the lasing wavelength. In this case, the element may be an intrinsic waveguided interferometer 208 disposed along the in-bulk propagation path as shown. A Mach-Zehnder interferometer is one possible implementation. Another intrinsic interferometer 209 may also be integrated along the propagation path for further wavelength or other spectral control. Alternatively or additionally, the control element may include an intrinsic grating 210 inserted inside a waveguide segment (as shown in FIG. 2B) or alongside the waveguide (as a waveguide segment spaced from the propagation path).

Bandwidth (or linewidth) control may be another feature or aspect of the disclosed lasers. In spectroscopy, the laser linewidth must often be narrower than the molecular absorption linewidth of interest. In some other applications, short pulse generation for example, the bandwidth must be broad (in order to support a short pulse) and potentially shaped (for example flat or Gaussian intensity profile as function of wavelength). Most often the bandwidth is controlled using free-space elements and therefore is highly susceptible to perturbations. In the disclosed lasers, free-space elements are avoided, and instead least one intrinsic element is integrated and located in the glass hub to control the linewidth of our hybrid laser. The intrinsic element may be a waveguided interferometer, such as the elements 208 and 209 in FIG. 2B. Alternatively or additionally, the element may be an integrated grating inserted inside a waveguide segment or alongside a waveguide segment, such as the element 210 in FIG. 2B.

Figure 5:
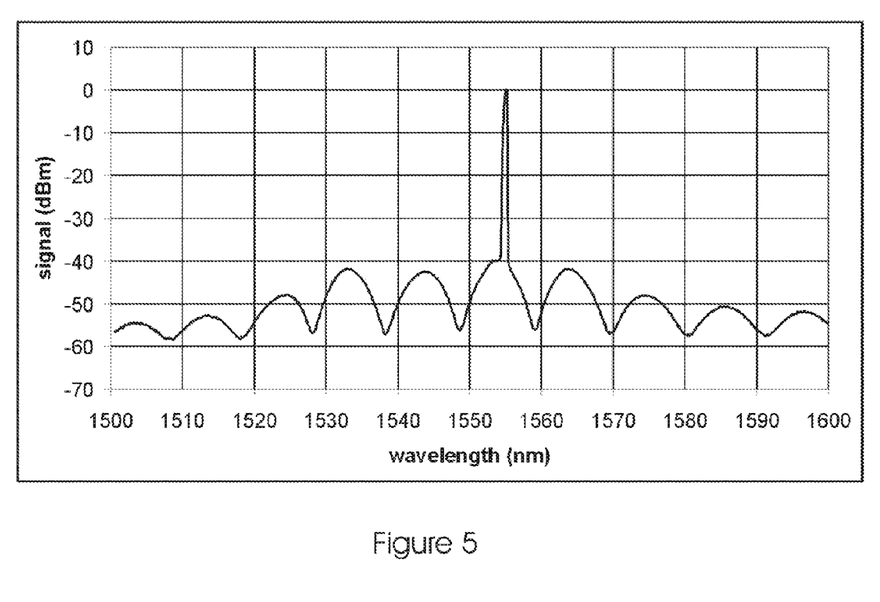
FIG. 5 is plan view of an exemplary interferometer having a plurality of intrinsic waveguides to control the central lasing wavelength in accordance with one or more aspects of the disclosure, and with a graphical plot of the resulting experimental spectrum.

The configuration and performance of an exemplary intrinsic interferometer are shown in FIG. 5. The interferometer may be integrated in any one of the lasers described herein.

Figure 3A:
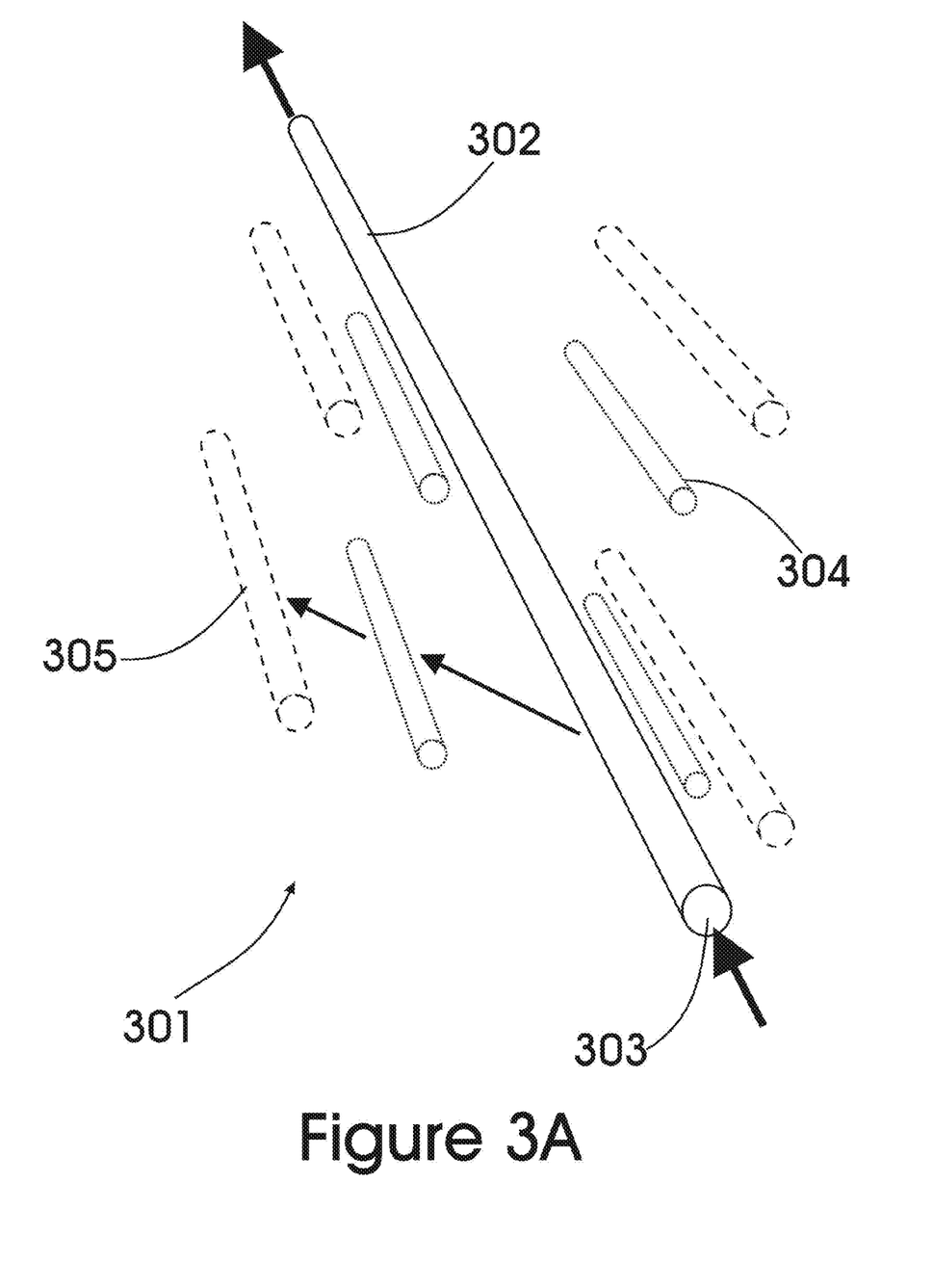
FIG. 3A is a schematic, perspective illustration of an exemplary high-low intensity discriminator (HLID) of the waveguide laser of FIG. 1 having an intrinsic, in-bulk waveguide array formed in the glass hub.
Figure 3B:
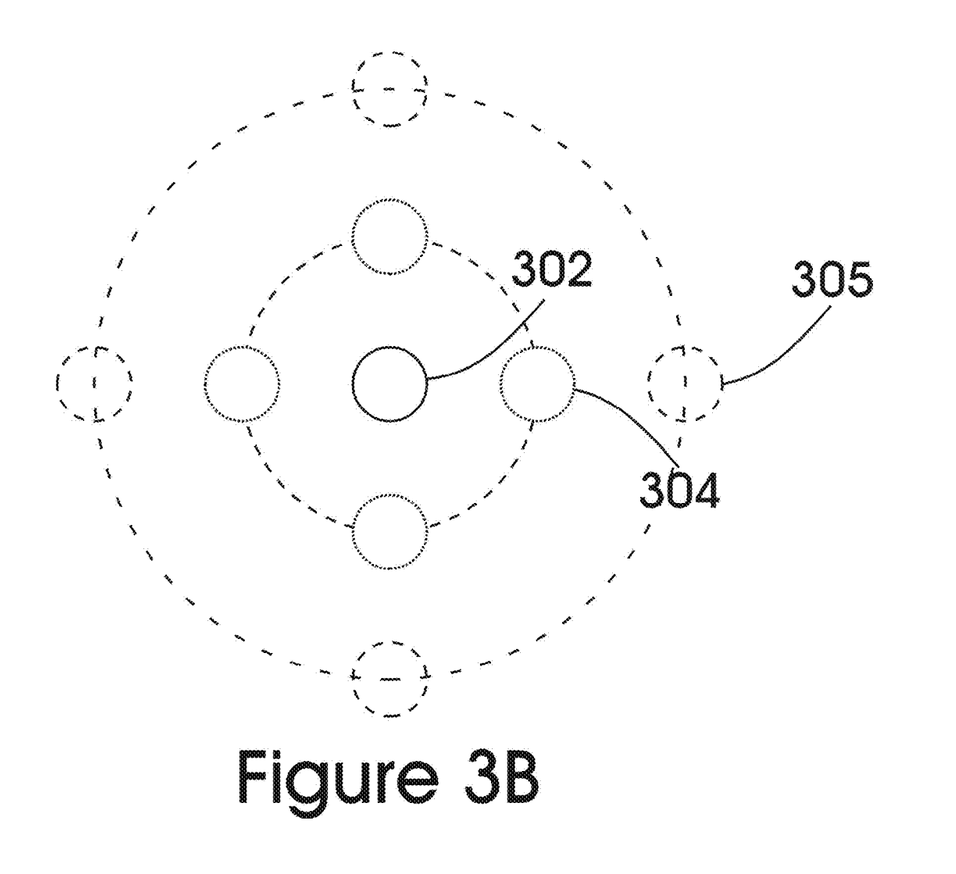
FIG. 3B is a schematic, cross-sectional illustration of the HLID of FIG. 3A.

Temporal control. Pulse shape (i.e. temporal) control may be yet another feature or aspect of the disclosed lasers. While the nature or characteristics of the pulse shaping device may vary, in some cases, an intrinsic high/low intensity discriminator (HLID) may be integrated into the glass hub to favor the transmission of selected intensity pulses. In one example, the discriminator may include one or more compact three dimensional waveguide arrays that can favor the generation of short, high peak-power pulses. An example is shown in FIGS. 3A and 3B. FIG. 3A shows a perspective view to depict the non-planar nature of a HLID 301, which includes several concentric rings of waveguide segments. The example of FIG. 3A is an embodiment with three rings, in which a central waveguide 302 is considered a single-element ring. Generally speaking, the central waveguide 302 is surrounded by an array of waveguide segments oriented in parallel with the in-bulk propagation path. Each parallel waveguide segment runs along a path radially offset from the propagation path of the central waveguide 302 and is arranged in one of a plurality of segment groups. As best shown in FIG. 3B, each group forms a respective concentric ring about the propagation path of the central waveguide 302. In operation, the optical signal enters the HLID 301 through a waveguide or other interface 303. The spacing between the rings running alongside the central incoming waveguide 302 may be optimized to favor energy transfer of low intensity signals (i.e., continuous wave signals) to an intermediary ring 304 of waveguide segments, and ultimately to an outside ring 305 of waveguide segments. The dispersion of the unwanted signals to the exterior rings occurs while the high intensity signals associated with short pulses stay on the central, incoming waveguide 302.

FIG. 3B shows a cross-sectional view of the HLID 301. The intermediary and outer rings of waveguides 304, 305 in this example are each formed of four waveguide segments disposed alongside the main propagation path of the central waveguide 302. The number of waveguide segments in each ring may vary considerably, and the specific number of the example shown is for illustration purposes only. The optimum number of elements may vary as a function of the ring spacing and desired intensity discrimination.

The HLID 301 need not include a three-dimensional ring. For example, the waveguide segments disposed alongside the central waveguide 302 may be oriented in a planar configuration. While the configuration of the coupled array arrangement of the HLID 301 may vary, the fundamental initial tendency is for the signal energy to spread out via nearest neighbor waveguides, away from its initial localization. Simulations have shown that coupling in smaller order arrays tend to uniformly distribute the energy among all the waveguides prior to it localizing in channels at the perimeter. Eventually, some of this energy will start cycling back from these partially localized regions towards the previously excited waveguides closer to the array center (or launch region). In order to prevent oscillation about these distributed states and to optimize signal localization and isolation in the desired channels, selective truncation of the individual waveguides may be introduced.

Further details regarding the coupled array arrangement may be found in the description of short pulse generation via waveguide arrays in a non-integrated, non-intrinsic implementation in Proctor et al., "Passive mode-locking by use of waveguide arrays," Optics Letters, Vol. 30, No. 15, pp 2013 et seq. (2005), the disclosure of which is hereby incorporated by reference. Operation in the monolithic substrate of the glass hub provides advantages to improve performance.

A structure similar to the HLID 301 may be used to create an integrated, intrinsic optical limiter, which may be used to improve the stability of the system, or to make the output energy independent of wavelength tuning. For this purposes, the configuration of the HLID structure would be optimized to favor the transmission of low intensity pulses.

Polarization control. Polarization control may be yet another feature or aspect of the disclosed lasers. The intrinsic waveguides formed in the bulk of the glass volume generally have a symmetrical structure and are mostly polarization insensitive (i.e., the waveguides show no preference to a given polarization state). However, the cross-section of any one waveguide or waveguide segment may be modified in order to create a polarization preference. For example, a waveguide may have a geometrically non-symmetrical cross-section, or a non-symmetrical region or environment of modified refractive index alongside or otherwise near a symmetrical cross-section, creating so-called stressors, which define a preferential axis. Furthermore, the intrinsic couplers and splitters of the hub may be configured to favor the transfer of one polarization over the other, thereby effectively creating a polarizer. Further details regarding polarizer structures and the manner in which the structures are fabricated may be found in the above-referenced U.S. patents.

Pump coupler. The disclosed lasers may be pumped by a variety of diode lasers. The intrinsic pump coupler integrated into the glass hub is generally responsible for coupling the diode laser light into the gain fiber. The coupler transfers as efficiently as possible the energy from the pump diode laser to the gain fiber. In some cases, the fiber link of the gain stage may include one or more dual clad gain fiber segments to improve the coupling and pumping efficiencies.

Figure 4A:
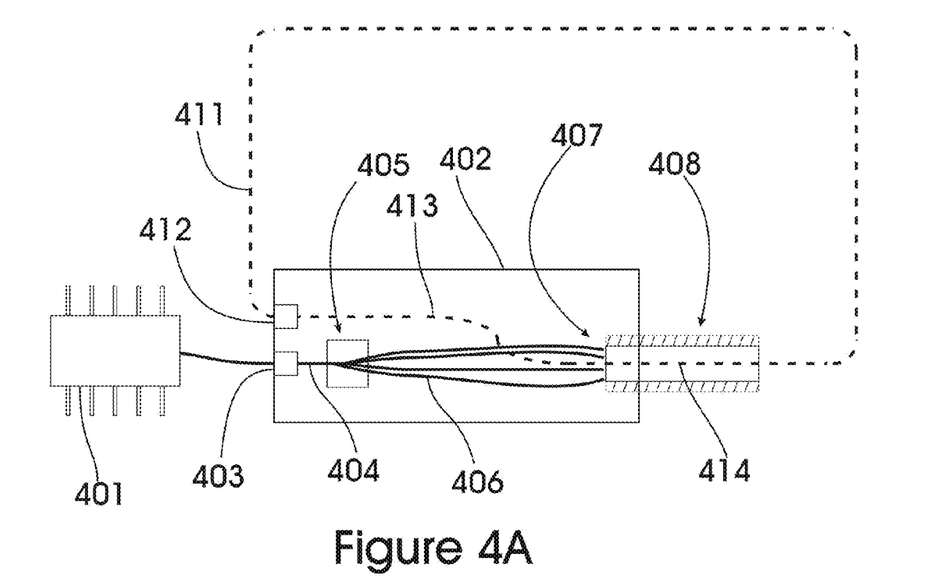
FIG. 4A is a schematic illustration of an exemplary glass hub having a multi-angle coupler with a plurality of intrinsic waveguides used to pump a dual clad gain fiber in accordance with one embodiment.
Figure 4B:
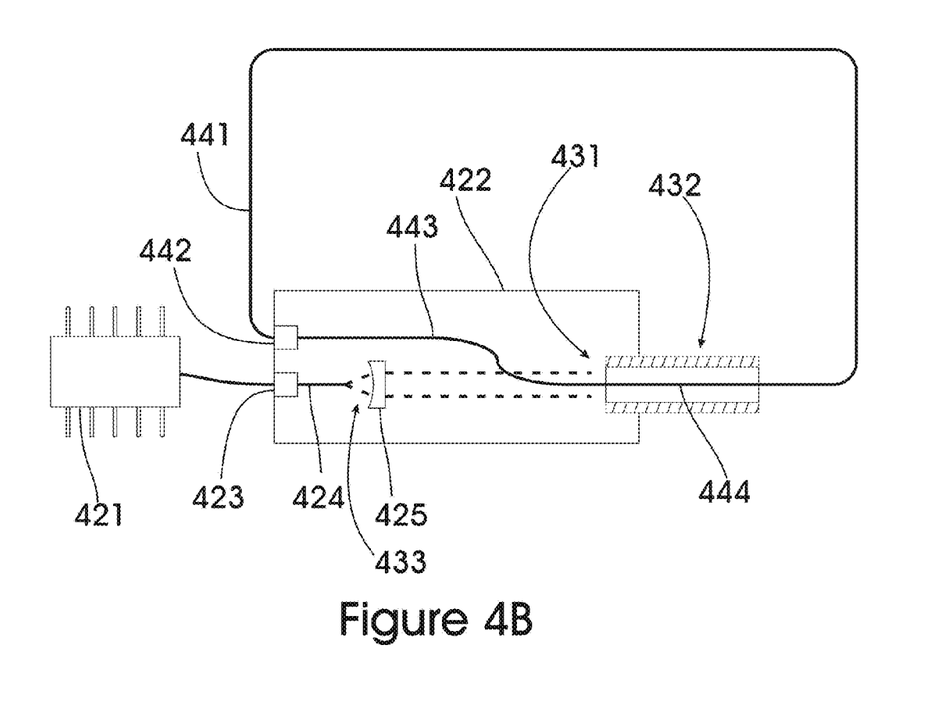
FIG. 4B is a schematic illustration of another exemplary glass hub having a direct coupler with an intrinsic lens to pump a dual clad gain fiber in accordance with one embodiment.

With reference now to FIGS. 4A and 4B, two intrinsic pump couplers are configured to efficiently couple the pump laser into single-clad fiber or dual clad fiber. The coupling to a single clad fiber may be generally accomplished through a waveguide coupler whose function is wavelength dependent. An example of this type of coupler is shown in FIG. 2A (see the coupler 206).

When pumping a dual clad fiber, the pump photons are directed toward the core and the larger inner cladding of the dual clad fiber. The inner cladding of the fiber may then address the progressive, continuous transfer and, ultimately, absorption of the inner-cladding bound photons into the fiber core.

FIG. 4A shows a single laser diode, multi-waveguide coupling design. The pump photons are generated by a fiber pigtailed diode laser 401 that is connected to a glass hub 402 via an input port 403 and an input waveguide segment 404. The input waveguide segment 404 leads to an intrinsic splitter 405 that splits the signal into several intrinsic, cladding-pumping waveguides 406. This arrangement provides a 1×4 input waveguide to cladding-pumping waveguide configuration. A variety of other splitter configurations, e.g., 1×M, may be used in alternative embodiments as well as multiple laser diode input waveguides. The configuration of the pump coupler (and, if applicable, splitter thereof) may also accommodate lasers having multiple pump sources.

The cladding-pumping waveguides 406 generally bring the diode laser energy near a face 407 of a dual clad fiber 408. The cladding-pumping waveguides 406 may be parallel with the main axis of the dual cladding fiber 408, or may point slightly off axis to optimize the energy transfer from the diode laser to the cladding. The signal from a fiber link 411 is connected to the hub 402 and the pump coupler thereof via an input port 412 and a waveguide segment 413 (shown as a dotted line for ease in illustration) that connects the input port to a core 414 of the dual clad fiber 408.

FIG. 4B shows an integrated lens coupling design. The pump photons are generated by a fiber pigtailed diode laser 421 that is connected to a glass hub 422 via an input port 423 and an input waveguide segment 424. The input waveguide segment 424 points toward an integrated lens 425 that collimates or focuses the pump light onto a face 431 of a dual clad fiber 432. In operation, the pump light exits the input waveguide segment 424 and diverges as it travels along a segment 433 of the in-bulk propagation path prior to reaching the lens 425. The lens 425 is one example of a non-intrinsic, yet still embedded, device integrated within the glass hub, in the sense that material is removed from the volume to form a material boundary in the desired lens shape. The lens-shaped void or hole can be formed in a variety of ways, including via femtosecond laser-based etching, in which the etch rate of the glass is modified via laser damage that falls short of ablation. The lens-shaped void or hole may then be completely or partially filled with another material, or left unfilled. For example, the hole may be capped at its end(s), e.g., on both top and bottom. The hole may have only one end or side to be capped in cases in which the lens does not extend all the way through the glass substrate That is, the lens may be formed via a blind hole. To complete the ring, the signal from a fiber link 441 is connected to the hub 422 via an input port 442 and a waveguide segment 443 that connects the input port to the dual clad fiber core 444.

Figure 4C:
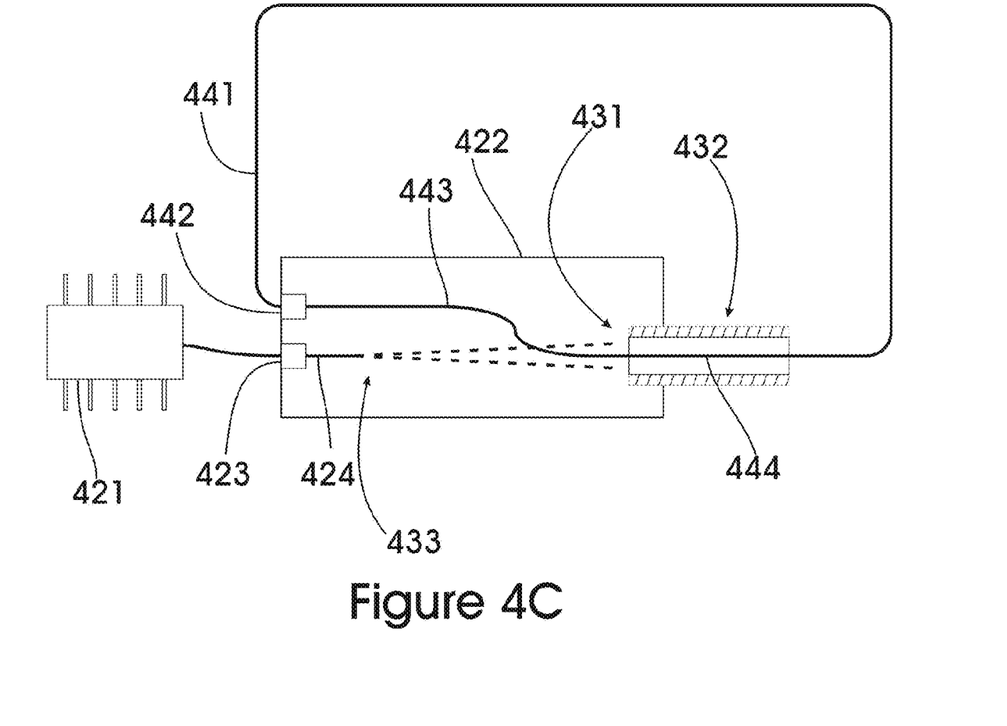
FIG. 4C is a schematic illustration of yet another exemplary glass hub having a lens-free, direct coupler to pump a dual clad gain fiber in accordance with one embodiment.

In the example of FIG. 4B, the pump light propagates in an unguided fashion along a segment of the propagation path between the end of the fiber segment 424 and the input of the dual-clad fiber 432. Despite being an exception to the otherwise fully guided propagation path, the optical (e.g., pump) signal does not encounter free space optics to enter a structure other than the monolithic structure of the glass hub. With each boundary of the lens fixed as part of the glass hub, the lens cannot go out of alignment. In cases in which the lens hole cannot be filled or capped, and contamination in the opening is a possibility, the lens may be formed intrinsically (i.e., via refractive index modification) to avoid the above-described free space optics issues by constructing the lens as a gradient index lens. In such cases, material removal is not relied upon, thereby eliminating any contamination and boundary issues. For example, the above-described femtosecond laser writing processes may be used to form an intrinsic Fresnel lens, as described in Watanabe et al., "Fabrication of Fresnel zone plate embedded in silica glass by femtosecond laser pulses," Optics Express, Vol. 10, pp. 978-983 (2002), the disclosure of which is hereby incorporated by reference. Alternatively, the lens may be eliminated all together to instead rely on natural divergence, as illustrated in the exemplary coupler shown in FIG. 4C, where elements in common with FIG. 4B have been indicated with like reference numerals.

Figure 6:
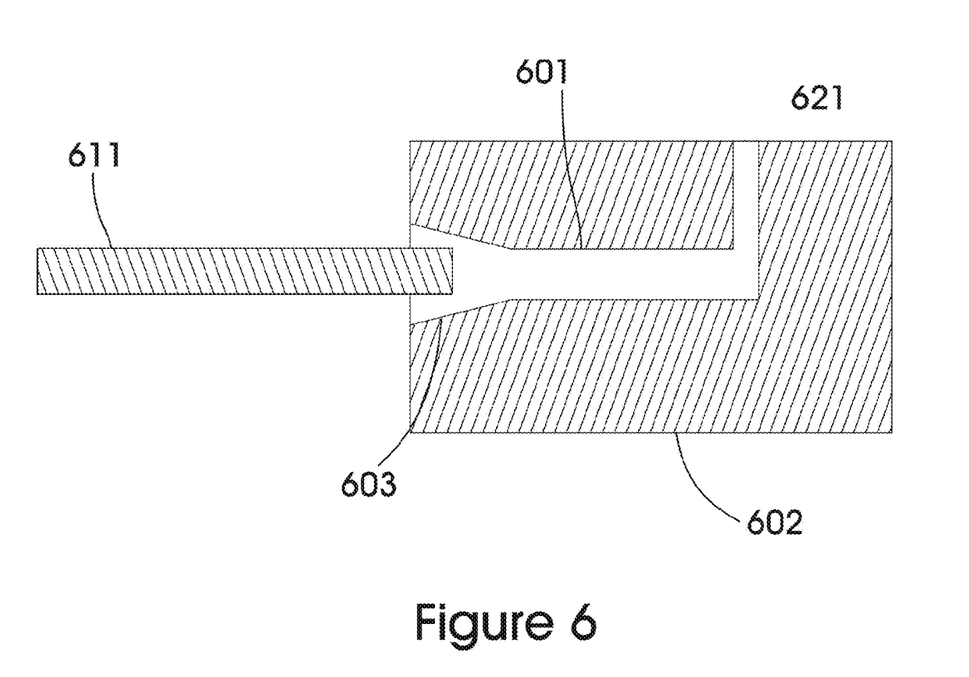
FIG. 6 is a schematic, cross sectional representation of a fiber attachment port at a hub-fiber interface of the disclosed lasers with a secondary escape channel for eliminating excess epoxy and air bubbles in accordance with one or more aspects of the disclosure.

Fiber attachment. Each interface between the fiber and the associated waveguide within the glass volume may be useful for supporting robust operation. Generally speaking, each fiber attachment interface or port may include a fiber reception hole in a face or side of the glass volume. In some cases, fiber-positioning V-grooves may be formed in the glass hub. More generally, a variety of different fiber attachment hole may be formed in the glass hub. One exemplary approach to forming a fiber attachment hole is illustrated in FIG. 6. Using the ultrafast laser and etching-based process referenced above, a hole 601 is created on one side of a glass hub 602. The attachment hole 601 may have a diameter equal or very slightly larger than the outer diameter of the optical fiber (e.g., desired tolerance <1 micron). An input end 603 of the hole 601 may be tapered. Tapered and other fiber reception holes may be formed via femtosecond laser-based etching and other techniques. An end of a fiber 611 is inserted in the hole end may be coated with UV-curable epoxy in the fiber attachment hole for UV-curing the fiber in position. Alternatively or additionally, one may insert some UV-curable epoxy in the hole prior to the fiber insertion. Yet another option involves using a heat curable binding agent.

In some cases, air bubbles are often trapped in the epoxy, even when we used very low viscosity epoxy. This challenge may be addressed by modifying the fiber reception or insertion hole of the fiber attachment port. Generally speaking, the modification includes a secondary or auxiliary channel or port to accommodate the bonding process. In the example shown, the fiber attachment interface includes a secondary side port 621 through which the excess epoxy and the air bubbles can escape.

The above-described hybrid waveguide lasers incorporate a number of useful features, components, and aspects. The disclosed lasers generally include a network of waveguides imbedded in a glass substrate, at least one gain fiber, and a source for pumping the gain fiber, the connections of which need not involve any free-space optics. The gain fiber may be being permanently attached to the glass substrate either directly or via an undoped fiber. The glass substrate is free of fiber waveguides, and may lack any dopant materials. The network of waveguides imbedded in the glass substrate controlling the light emitted by the gain fiber (bandwidth, central wavelength, temporal shape, polarization, repetition rate, etc.). The network of waveguides imbedded in a glass substrate generally connects one end of the fiber link to the other end of the fiber link. The network of waveguides imbedded in the glass substrate allows the use of "stressors" to control polarization. The fiber interface port may have an intervening element—e.g., a lens, epoxy, etc., such that a fiber tip or end is disposed at the port even if an intermediate structure or other element is present between the fused silica or other glass of the block and the fiber tip or end. In the event that an intervening element is present, the arrangement still avoids the disadvantages of free-space propagation between the gain stage and the pump stage.

The term "along" is used herein in a broad sense to mean "over a section or length of, for instance, a path" or "in accordance with" such that a waveguide disposed along a path may be directly on or integral with the propagation path. The term "alongside" is used herein to denote that an object is abreast of, near, or to the side of another object, including, for instance, side-by-side waveguides that run along parallel paths.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A laser comprising:
a gain stage comprising a fiber link, the fiber link comprising a doped fiber and terminating at a pair of ends; and
a pump stage comprising a glass volume, the glass volume having a pair of fiber interface ports at which the pair of ends of the fiber link are disposed, respectively, for attachment of the gain stage and the pump stage in a ring laser assembly;
wherein the pump stage includes multiple optical devices configured to control operation of the laser the multiple optical devices being integrated and defined in the glass volume and including a plurality of intrinsic waveguides defined in the glass volume and disposed along in-bulk propagation paths within the glass volume for light travel through the ring laser assembly.

2. The laser of claim 1, wherein each fiber interface port includes a fiber reception hole in a side of the glass volume.

3. The laser of claim 2, wherein each fiber reception hole is tapered.

4. The laser of claim 2, wherein each fiber interface port includes a secondary side hole and a channel linking the fiber reception hole and the secondary side hole.

5. The laser of claim 1, wherein multiple waveguides of the plurality of intrinsic waveguides are arranged as a pump coupler.

6. The laser of claim 1, wherein a number of the plurality of intrinsic waveguides are arranged as an interferometer.

7. The laser of claim 1, wherein the pump stage further includes an intrinsic grating defined in the glass volume along a respective waveguide of the plurality of intrinsic waveguides.

8. The laser of claim 1, wherein the pump stage further includes an intrinsic high/low intensity discriminator defined in the glass volume, the intrinsic discriminator including an array of parallel waveguide segments disposed alongside a respective one of the in-bulk propagation paths.

9. The laser of claim 8, wherein each parallel waveguide segment runs along a path radially offset from the respective in-bulk propagation path and is arranged in one of a plurality of segment groups, each group forming a respective concentric ring about the respective in-bulk propagation path.

10. The laser of claim 1, wherein the pump stage includes an intrinsic polarizer defined in the glass volume, the intrinsic polarizer including a respective region of modified refractive index alongside a respective one of the in-bulk propagation paths to introduce a polarization preference.

11. The laser of claim 1, wherein the fiber link comprises dual-clad fiber.

12. The laser of claim 11, further comprising a pump laser coupled to the pump stage via an input interface of the glass volume, wherein the plurality of intrinsic waveguides includes an input waveguide that runs from the input interface, and wherein the pump stage further includes an intrinsic splitter that includes a set of cladding-pumping intrinsic waveguides, each of which couples the input waveguide to an inner cladding of the dual-clad fiber.

13. The laser of claim 11, further comprising a pump laser coupled to the pump stage via an input interface of the glass volume to provide pump light, wherein the plurality of intrinsic waveguides includes an input waveguide that carries the pump light from the input interface, and wherein the pump stage further includes an intrinsic lens defined in the glass volume and configured to direct the carried pump light onto a face of the dual-clad fiber.

14. The laser of claim 13, wherein the intrinsic lens is spaced from an end of the input waveguide such that the pump light diverges along a further in-bulk propagation path within the glass volume before reaching the lens such that the lens focuses the pump light onto the face of the dual-clad fiber.

15. A laser comprising:
a glass hub comprising a block of glass and multiple optical devices configured to control operation of the laser the multiple optical devices being integrated and defined within the block and including a plurality of intrinsic waveguides defined along in-bulk propagation paths within the block, the block having a plurality of fiber attachment ports at which corresponding waveguides of the plurality of intrinsic waveguides terminate;
a fiber link comprising a gain fiber and terminating at a pair of ends, each of which is disposed at a respective ring interface port of the plurality of fiber attachment ports for attachment of the glass hub and the fiber link in a ring laser assembly; and
a pump laser coupled to the glass hub via an input interface port of the plurality of fiber attachment ports;
wherein respective waveguides of the plurality of intrinsic waveguides are arranged as a pump coupler between the pump laser and the fiber link.

16. The laser of claim 15, wherein each fiber attachment port includes a fiber reception hole in a side of the block.

17. The laser of claim 16, wherein each fiber reception hole is tapered.

18. The laser of claim 16, wherein each fiber attachment port includes a secondary side hole and a channel linking the fiber reception hole and the secondary side hole.

19. The laser of claim 15, wherein a number of the plurality of intrinsic waveguides are arranged as an interferometer.

20. The laser of claim 15, wherein the pump stage further includes an intrinsic grating defined in the block along a respective waveguide of the plurality of intrinsic waveguides.

21. The laser of claim 15, wherein the pump stage further includes an intrinsic high/low intensity discriminator defined in the block, the intrinsic discriminator including an array of parallel waveguide segments disposed alongside a respective one of the in-bulk propagation paths.

22. The laser of claim 21, wherein each parallel waveguide segment runs along a path radially offset from the respective in-bulk propagation path and is arranged in one of a plurality of segment groups, each group forming a respective concentric ring about the respective in-bulk propagation path.

23. The laser of claim 15, wherein the pump stage includes an intrinsic polarizer defined in the block, the intrinsic polarizer including a respective region of modified refractive index alongside a respective one of the in-bulk propagation paths to introduce a polarization preference.

24. The laser of claim 15, wherein the fiber link comprises dual-clad fiber.

25. The laser of claim 24, wherein the plurality of intrinsic waveguides includes an input waveguide that runs from the input interface, and wherein the glass hub further includes an intrinsic splitter that includes a set of cladding-pumping intrinsic waveguides, each of which couples the input waveguide to an inner cladding of the dual-clad fiber.

26. The laser of claim 24, wherein the plurality of intrinsic waveguides includes an input waveguide that carries pump light from the input interface, and wherein the glass hub further includes an intrinsic lens defined in the block of glass and configured to direct the carried pump light onto a face of the dual-clad fiber.

27. The laser of claim 26, wherein the intrinsic lens is spaced from an end of the input waveguide such that the pump light diverges along a further in-bulk propagation path within the block before reaching the lens such that the lens collimates the pump light onto the face of the dual-clad fiber.

* * * * *

UNITED STATES PATENT AND TRADEMARK OFFICE
CERTIFICATE OF CORRECTION

| | | |
|---|---|---|
| PATENT NO. | : 8,077,748 B1 | Page 1 of 1 |
| APPLICATION NO. | : 12/691871 | |
| DATED | : December 13, 2011 | |
| INVENTOR(S) | : Mark A. Dugan, Ali Said and Philippe Bado | |

It is certified that error appears in the above-identified patent and that said Letters Patent is hereby corrected as shown below:

In the claims:

Column 14, claim 1, line 23, please add a "," after the word "laser".

Column 15, claim 15, line 18, please add a "," after the word "laser".

Signed and Sealed this
Sixth Day of March, 2012

David J. Kappos
*Director of the United States Patent and Trademark Office*